May 1, 1928.  G. F. EGAN  1,668,058
VEHICLE BUMPER
Filed July 10, 1925   2 Sheets-Sheet 1
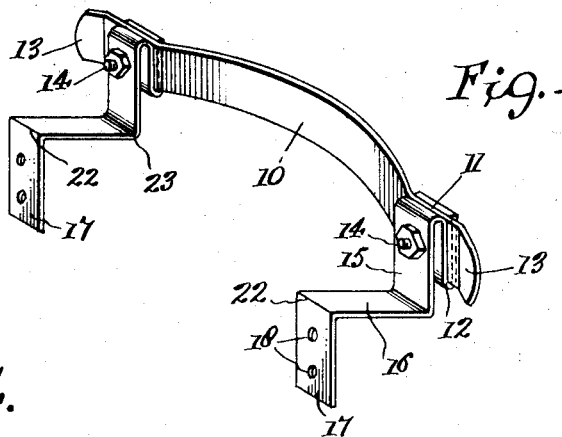
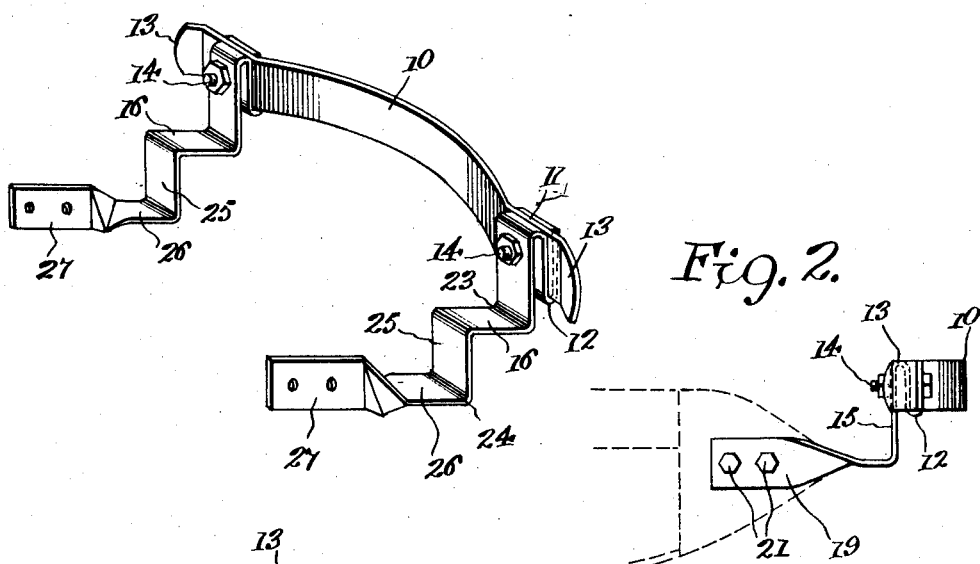
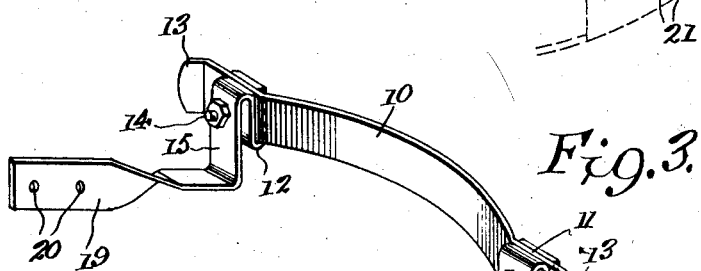
Inventor
George F. Egan,
by James R. Bowen
Attorney

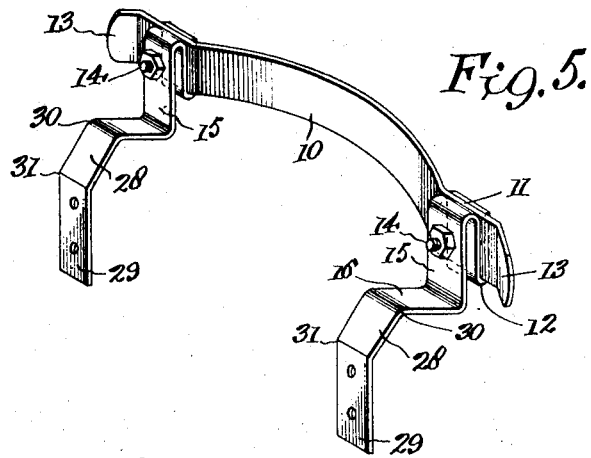
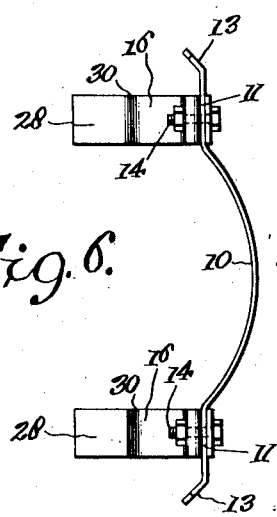
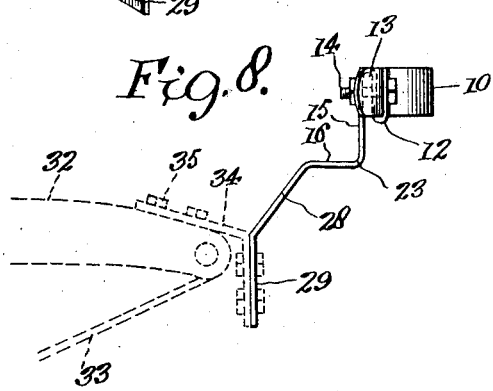
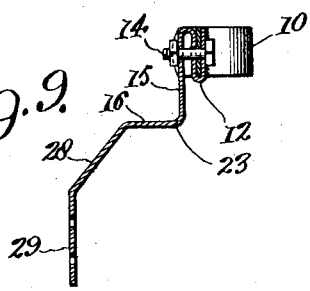
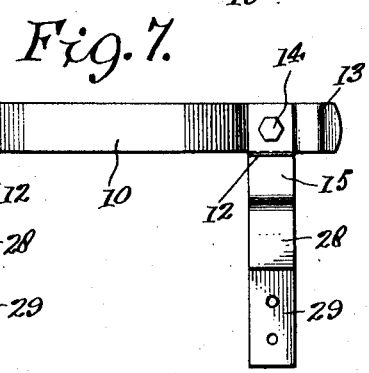

Patented May 1, 1928.

1,668,058

UNITED STATES PATENT OFFICE.

GEORGE F. EGAN, OF JERSEY CITY, NEW JERSEY.

VEHICLE BUMPER.

Application filed July 10, 1925. Serial No. 42,711.

The present invention relates to improvements in vehicle bumpers and has for an object to provide an improved bumper for attachment to the front or rear, or both, of a vehicle body, in which the bumper bar is supported for yielding movement and is sustained independently of bolts.

Heretofore much damage has been done to radiators, fenders and chassis of automobiles by reason of the fact that in the initial impact of a collision bumper bolts are sheared off thus permitting the entire bumper bar or at least one end thereof to fall to the ground, withdrawing the protection intended.

The purpose of the present invention is to form supporting loops in the bracket arms in which the bumper bar is received and sustained independently of bolts. The bumper bar may be bent in such a way that it cannot move longitudinally in these loops or clips so that virtually the only way of escape is by lifting the bumper bar upwardly. The weight and shape of the bumper bar tend to hold it in the loops or clips and render it difficult to dislodge the bumper bar upwardly.

It is a further object of the present invention to accomplish the above results in an economical, simple form of construction adaptable to the present construction of vehicle bodies without any modification.

A still further object of the invention is to secure resiliency or yielding action in the supporting arms and clips so that this action is additive to that of the bumper bar itself.

With the foregoing and other objects in view, the invention will be more fully described hereinafter, and will be more particularly pointed out in the claims.

In the drawings, wherein like symbols refer to like or corresponding parts throughout the several views:

Figure 1 is a perspective view of a bumper bar and two supporting arms shown as constructed in accordance with the present invention;

Figure 2 is a side view thereof showing a slight modification in the form of attachment;

Figure 3 is a perspective view of this same modified form;

Figure 4 is a perspective view of a still further modified form;

Figure 5 is a perspective view of a further modification;

Figure 6 is a top plan view thereof;

Figure 7 is a front view;

Figure 8 is a side view of the device applied to a vehicle; and

Figure 9 is a section taken vertically through the bumper bar and one of the supporting arms.

Referring more particularly to Figure 1, 10 indicates a bumper bar. This bar may be of any appropriate material, as for instance malleable steel. The bumper bar, 10, may, as shown, have its intermediate portion bowed outwardly for the purpose of increasing the resiliency and also as a protection while adding to the design of the bumper bar. The portions 11 are shown as substantially straight and in the same plane and these portions 11 are shown as received into clips or loops 12, formed upon the outer ends of supporting arms. The bar is shown as projecting outwardly beyond the clips and the extremities 13 are shown as bent preferably reversely to the bend of the bowed part 10. The bowed portion also tends to prevent the bumper from being moved lengthwise in the clips and this is further prevented by the bent extremities 13. The bottoms of the clips 12 are closed and their upper portions open so that the bumper may be admitted to, and withdrawn from, the clips only by a vertical movement. The bumper bar may be relatively heavy and if merely laid in the clips it will remain there due to its weight. However, bolts 14 may be used to secure the end portions 11 of the bumper bar in the clips 12.

The clips are formed by making U-folds in the outer end portions of the clips. Back of the clips and substantially parallel therewith vertical plates 15 are shown which may also receive the bolts 14. These plates are shown as spaced from the clip so that the clip walls and the plates 15 form a substantially S-curve securing great strength. A space may be provided, as shown, between the vertical plates 15 and the clips 12, and if such space is provided the bumper bar and the clips will be given a greater degree of resilience. Of course, this space may be dispensed with if desired. These parts of the S are shown as held securely and rigidly together by the bolts 14 which adds to the strength of this construction. The arms are shown as further formed with horizontal plates as 16 shown as bent toward the vehicle from the lower ends of the plates 15, and inner vertical plates 17 are shown as bent downwardly from the inner ends of the horizontal plates 16. The last mentioned vertical plates are shown as perforated at 18 to receive bolts or other fastenings by which the arms are secured to the body of a vehicle.

In Figures 2 and 3 19 designates attaching plates shown as provided with perforations 20. The attaching plates 19 are shown as brought directly back from the horizontal plates 16 and as so twisted that edgewise the attaching plates 19 extend vertically. In Figure 2 the plates 19 are shown as fitted against the side portions of a vehicle body to which they are shown as secured by bolts, 21.

In the form of device shown in Figure 1 there is a certain yielding action secured by the angle portion 22 which is an addition to that afforded by the front angle portion 23. These arms are preferably made of such material as may bend under great strain, and thereby permit a certain yielding action in not only the bumper bar but in also the supporting arms which will permit the bending rather than the breaking of the parts.

In Figure 4 an additional bend or angle 24 is shown as included in the supporting arms and the supporting arms are shown as longer for this purpose and as providing an inner vertical plate 25 and a horizontal plate 26 shown as extending inwardly from the lower portion of the inner vertical plate 25. The attaching perforated plates 27 are shown in this case as twisted similarly to the plates 19 for affixing to the side portions of a vehicle body. With this arrangement the bumper bar may be supported at a higher elevation than with the construction shown in Figures 1 to 3, inclusive, and a greater degree of yieldability may be afforded.

In Figures 5 to 9, the plate 28 which corresponds to the inner vertical plate is shown as arranged diagonally and the attaching plate 29 as arranged vertically.

The angles 30 and 31 are not shown as right angles but they afford a greater degree of yieldability. The plate 28 may be long or short and the arms may be bent in various shapes and with the parts arranged at different angles to secure the elevation and position required at the bumper bar to best secure the desired protection.

In Figure 8 32 designates a chassis channel beam, and 33 a spring. An additional arm 34 is shown as bolted at 35 to the channel beam. Said arm 34 is shown as having its forward down turned branch bolted to the vertical attaching plate 29. The attachment might be arranged for the side if desired or found necessary. The arm 34 may be an extension of the supporting arm of which it is part.

In all instances the bumper bar is shown as supported directly in the clips without being able to slide longitudinally therein in either direction or to escape either forwards, rearwards or downwards. Should the bolts 14 be sheared off nevertheless the bumper will ordinarily retain its position of protection by reason of its support in the clips. In proportion to the shock of an impact so will the bumper bar and the bumper supporting arms yield or bend, but they will offer substantial resistance to this bending action throughout the entire period of the stress.

The bumper bar and its supporting arms are of a construction susceptible of easy and economical manufacture and the arms may be bent to any appropriate position suitable for application to the constructions and conditions of vehicles upon which application is to be made.

It is obvious that various changes and modifications may be made in the details of construction and design of the above specifically described embodiments of this invention without departing from the spirit thereof.

What is claimed is:—

1. A bumper comprising a bumper bar, supporting means having clips to receive and support from beneath the bumper bar, said bumper bar being shaped to prevent longitudinal movement of the bar in said clips.

2. A bumper comprising a bowed bumper bar having substantially straight end portions and bent extremities outward of the bowed bar, and supporting means having clips closed at the front and rear and bottom portions thereof but open at the top and side portions for receiving said straight end portions of the bumper bar, the bent extremities lying outward of the clips and the bowed portion of the bar lying inwardly of the clips and engaging the clips to avoid the longitudinal movement of the bar.

3. A bumper construction comprising a bumper bar, arms having attaching plates for securing same to a vehicle, and clips to receive and support said bumper bar, said clips being formed by bending the material upon itself, said arms also including substantially vertical plates parallel with said clips and forming a substantially S construction therewith, and fastenings passing through both portions of the U shaped clips and said vertical plate.

4. A bumper construction comprising a bowed bumper bar having straight end portions and bent extremities, supporting arms for the bar having attaching plates adapted to be secured to a vehicle and provided with substantially U shaped clips for receiving and supporting the bumper bar, said arms also having substantially vertical and horizontal plates alternating with one another and forming angle portions therebetween, the outermost vertical plate being parallel with the two walls of the clip, and fastening means passing through said outer vertical plate and the two walls of the clip.

In testimony whereof I affix my signature.

GEORGE F. EGAN.